United States Patent
Watt, Jr. et al.

(10) Patent No.: US 10,146,518 B1
(45) Date of Patent: Dec. 4, 2018

(54) SMART RETENTION POLICY APPLIANCE FOR LEGAL COMPLIANCE

(71) Applicant: Dell Products L. P., Round Rock, TX (US)

(72) Inventors: James S. Watt, Jr., Austin, TX (US); Rene Herrero, Austin, TX (US); Kareemullah Khan Fazal, Austin, TX (US); Mark D. Owens, Austin, TX (US); Douglas Alencar, Carlow (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/605,233

(22) Filed: May 25, 2017

(51) Int. Cl.
| | |
|---|---|
| *G06Q 99/00* | (2006.01) |
| *G06F 17/30* | (2006.01) |
| *G06Q 20/32* | (2012.01) |
| *G06F 8/61* | (2018.01) |
| *G06F 8/71* | (2018.01) |

(Continued)

(52) U.S. Cl.
CPC .............. *G06F 8/62* (2013.01); *G06F 8/71* (2013.01); *G06F 17/30044* (2013.01); *G06F 21/105* (2013.01); *G06F 21/6218* (2013.01)

(58) Field of Classification Search
CPC ........ G06F 3/0619; G06F 3/065; G06F 3/067; G06F 21/10; G06F 21/105; G06F 21/6218; G06F 8/62; G06F 8/65; G06F 8/71; G06F 8/61; G06F 8/60; G06F 17/30575; G06F 11/1451; G06F 11/1453; G06F 11/1456; G06F 11/1469; H04L 43/16;

(Continued)

(56) References Cited

U.S. PATENT DOCUMENTS

| | | | | |
|---|---|---|---|---|
| 8,069,119 B2 * | 11/2011 | Curren | .................... | G06F 21/10 705/59 |
| 8,751,807 B2 * | 6/2014 | Ma | ........................ | H04L 9/0891 713/168 |

(Continued)

OTHER PUBLICATIONS

Kim et al., A birthmark-based method for intellectual software asset management, 6 pages (Year: 2014).*

(Continued)

*Primary Examiner* — Thuy Dao
(74) *Attorney, Agent, or Firm* — Campbell Stephenson LLP; Shiv S. Naimpally (57) ABSTRACT

A software package retention system that uses pre-defined rules to retain software packages based on how the packages are used, and not merely based on a package's date/time of creation (age) or type. A retention policy server in the system integrates with the build, deployments, and artifact storage systems of a software supplier/vendor to ensure appropriate retentions are met for audit and regulatory compliance and unneeded artifacts or packages are purged to save storage space and lower operational costs. The server has the capability to monitor software deployments to the customer and to developer test environments, and to make rule-based decisions on when and how to run retention policy clean-up jobs and on what packages. With increasing reliance on frequent build and release of software packages across the software industry, package management post-release using the rule-based retention policy provides an efficient and cost-effective solution for legal compliance with retention requirements.

20 Claims, 3 Drawing Sheets

(51) Int. Cl.
*G06F 21/10* (2013.01)
*G06F 21/62* (2013.01)

(58) Field of Classification Search
CPC .. H04L 63/0428; G06Q 10/10; G06Q 10/107; F25D 2700/08
See application file for complete search history.

(56) References Cited

U.S. PATENT DOCUMENTS

| | | | | |
|---|---|---|---|---|
| 8,819,854 | B2* | 8/2014 | Nakagawa | G06F 21/105 380/28 |
| 9,146,711 | B1* | 9/2015 | Boudreau | G06F 8/24 |
| 9,246,688 | B1* | 1/2016 | Stickle | H04L 9/3247 |
| 9,311,457 | B1* | 4/2016 | Thirthala | H04L 67/02 |
| 9,390,088 | B2* | 7/2016 | Belfoure | G06F 17/30011 |
| 9,483,625 | B2* | 11/2016 | Vijay | G06F 21/10 |
| 2010/0229000 | A1* | 9/2010 | Png | G06F 21/10 713/190 |
| 2013/0144742 | A1* | 6/2013 | Thakur | G06F 21/105 705/26.1 |
| 2016/0142482 | A1* | 5/2016 | Mehta | G06F 17/30575 709/203 |
| 2016/0179416 | A1* | 6/2016 | Mutha | G06F 3/0619 711/162 |
| 2017/0220778 | A1* | 8/2017 | Fuse | G06F 8/71 |

OTHER PUBLICATIONS

Cabutto et al., Software Protection with Code Mobility, 9 pages (Year: 2015).*

* cited by examiner

SMART RETENTION POLICY APPLIANCE FOR LEGAL COMPLIANCE

TECHNICAL FIELD

This disclosure relates generally to software retention for legal compliance and, more particularly, to a rule-based software retention system that monitors various stages of software deployments and retains a software package for storage for a time period based on the usage status of the software package as specified by a rule.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems support execution of a number of different types of software such as, for example, operating system software, gaming applications, social networking programs, document management software, and so on. The companies supplying one or more types of such software are increasingly switching to the Continuous Integration/Continuous Development (CI/CD) model of software design and deployment. The CI/CD is a software development methodology that relies on producing, qualifying, and deploying software builds and artifacts in real time as the program code is created by the software development team. As used herein, the term "build" refers to a software development process that converts source code into executable binaries or artifacts. Thus, the term "artifact" refers to a binary or other output of a build process. In the discussion herein, the terms "package" and "artifact" may be used interchangeably.

Many companies switching to the CI/CD model typically require that the software released to the customer (or end user) be retained for certain periods of time so as to be able to procure it in case of some legal or audit challenge. Typical retention policies for customer-supplied software range from 2 to 10 years. Currently, retention policies are implemented based on a software package's age or type. For example, a software package may be retained for a specific time period based on when the package was built. In case of a package type-based retention, a "Dev" (Development) build package may be retained for 14 days, a "Release" build package may be retained for 365 days, and so on. In the discussion herein, the term "retention policy" refers to a process for determining which artifacts to keep and which to delete.

SUMMARY

This Summary provides a simplified form of concepts that are further described below in the Detailed Description. This Summary is not intended to identify key or essential features and should therefore not be used for determining or limiting the scope of the claimed subject matter.

The present disclosure relates to a smart retention system that uses pre-defined rules to retain software packages based on how a particular project's packages are used, and not merely based on a package's date/time of creation (age) or type. The system according to the present disclosure can integrate with the build, deployments, and artifact storage systems of a software supplier/vendor to ensure appropriate retentions are met and unneeded packages are purged to save storage space and lower operational costs. An artifact retention policy server as per teachings of particular embodiments of the present disclosure has the capability to monitor software deployments to the customer (or end user) and even to developer test environments, and to make rule-based decisions on when and how to run retention policy clean-up jobs and on what packages.

In one embodiment, the present disclosure is directed to a method, which comprises: (i) monitoring, by a computing system, a respective deployment status of each artifact in a plurality of artifacts in a software development environment; (ii) assigning, by the computing system, each artifact with a deployment status-specific tag; (iii) for each artifact, identifying, by the computing system, a tag-specific rule associated with the status-specific tag of the artifact; and (iv) retaining, by the computing system, each artifact in a storage for a corresponding retention period indicated by the tag-specific rule associated with the artifact.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) monitor a respective deployment status of each artifact in a plurality of artifacts in a software development environment; (ii) assign each artifact with a deployment status-specific tag; (iii) for each artifact, identify a tag-specific rule associated with the status-specific tag of the artifact; and (iv) retain each artifact in the memory for a corresponding retention period indicated by the tag-specific rule associated with the artifact.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (a) monitoring a respective deployment status of each artifact in a plurality of artifacts in a software development environment; (b) assigning each artifact with a deployment status-specific tag; (c) for each artifact, identifying a tag-specific rule associated with the status-specific tag of the artifact; and (d) retaining each artifact in a storage for a corresponding retention period indicated by the tag-specific rule associated with the artifact.

As CI/CD processes—with more frequent build and release of software packages—become more ubiquitous across the software industry, package management post-release may be a continued area of focus. For example, a single application working in a true CI/CD fashion with pull request builds can produce as much as 100 GB (giga bytes) of artifacts a day. In case of multiple applications offered through a software delivery platform such as, for example, in a Platform as a Service (PaaS) operational model, the CI/CD process may generate a potentially huge volume (in multiple Tera Bytes (TBs)) of artifacts per day, which may need to be stored for many years for regulatory compliance. The rule-based smart retention policy as per particular embodiments of the present disclosure may provide means for efficiently cleaning up unneeded releases, thereby significantly reducing the storage costs for audit and regulatory compliance.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "tag-specific", "computer-readable", etc.) may be occasionally interchangeably used with its non-hyphenated version (e.g., "tag specific," "computer readable", etc.), and a capitalized entry (e.g., "Operating System", "Deployment System", "Database", etc.) may be interchangeably used with its non-capitalized version (e.g., "operating system," "deployment system," "database", etc.). Such occasional interchangeable uses shall not be considered inconsistent with each other.

As mentioned before, many software suppliers/vendors are switching to the CI/CD model of software design and deployment. The companies switching to the CI/CD model may face a challenge from fulfilling their regulatory and compliance auditing requirements. The software released to the customer may need to be retained for certain periods of time to be able to access it in case of some legal or audit challenge. Development teams at such companies also have a vested interest in robust retention policies as well because having access to the old binaries from test environments and production deployments can enable faster debugging and troubleshooting when locating the exact date/time of the introduction (or fix) of an issue. However, switching to daily or hourly releases (or software updates) may increase the number of artifacts being pushed to the customer (or end user) at an exponential rate. For example, as mentioned before, a single application working in a true CI/CD fashion with pull request builds can produce as much as 100 GB of artifacts a day. In case of a software vendor supporting over 70 applications, this would translate to a potential of 7 TB of artifacts produced per day. Typical retention policies for customer-facing software range from 2 to 10 years. Without some of efficiently cleaning up various software releases, the storage cost of such a large volume (7 TB) of artifacts may be in the range of $50,000 per day, or approximately $36 million for 2 years of regulatory compliance for all artifacts.

As more frequent build-and-release processes become ubiquitous across the software industry, package management post-release may be a continued area of focus. Particularly for banking or other highly-regulated industries, efficient retention policies are not only a matter of smart engineering, but are critical for audit and regulatory compliance. The retention policy features in these products typically rely on Information Technology (IT) administrators coding their own clean-up scripts (as Cron jobs) based on creation dates and times of software packages (or package's age)—for example, 60, 90, 180 day retention policies. This can lead to either unnecessary storage of packages for fear of deleting something useful or the deletion of packages that should be retained with the hope that no legal or audit challenge later will require them. In addition to allowing retention time period to be set on a package's age, certain DevOps tools also may allow implementation of a retention policy based on the type of individual projects—for example, a "Dev" build package to be retained for 14 days, a "Release" build package to be retained for 365 days, and so on. However, such retentions also may result in either unnecessary storage of package or unnecessary deletion of packages.

Similarly, there are products for individual PCs that attempt to help with file clean-up. For example, the Belvedere software by GitHub, Inc. of California is a file and package manager that makes decisions (for example, to move, copy, or delete a file) primarily based off of file extensions, size, and age. The CleanUp feature in the TeamCity software (an Atlassian Confluence software) by Atlassian of Sydney, Australia is limited by package age. Like the Artifactory product mentioned above, TeamCity also targets artifacts that haven't been used in a certain period of time.

The above-described mechanisms of retention based on package age or type are rudimentary solutions that do not necessarily provide any significant savings in storage cost while still allowing legal compliance. A challenge for Dev and Ops teams is to have all retention timings and rules configured properly depending on how a particular project's packages are used. For example, if a "Dev" package is deployed to production for a hotfix, the current solutions do not offer any adjustment to the "Dev" retention policy for that package in view of its unique deployment path or usage. This may cause Dev and Ops teams to typically over-retain packages "just in case" they are needed past a compliance window, and also requires them to manually set and maintain dozens, if not hundreds, of individual retention policies so that audit requirements are met. When this scenario is multiplied by the hundreds of Dev and Ops teams doing the same thing within an organization, it is evident that the package retention (and concomitant storage costs) can quickly become unmanageable.

It is therefore desirable to implement a retention policy that takes into account how a package or artifact is actually used. The deployment status of an artifact may change in a software development environment and, hence, it may not be preferable to implement a retention policy that is rigidly based on the artifact's age and/or type. The present disclosure relates to a smart retention service that has the capability to monitor software deployments to the customer (or end user) and even to developer test environments, and to make rule-based decisions on when and how to run retention policy clean-up jobs and on what packages. As noted before, the software development terms "package" and "artifact" may be used interchangeably herein.

Figure 1:
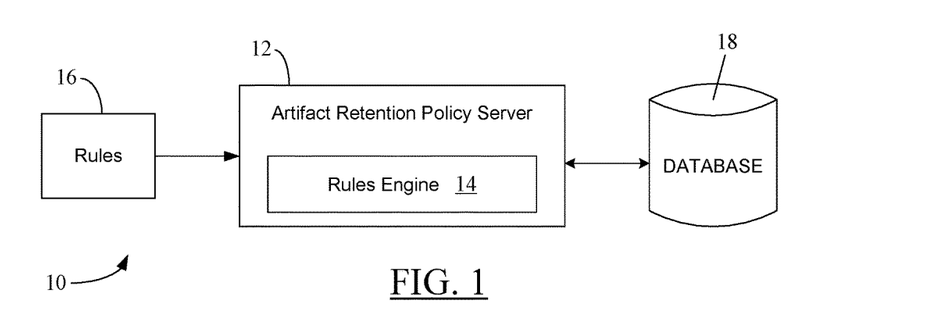
FIG. 1 shows an exemplary arrangement to implement a rule-based artifact retention policy using an Artifact Retention Policy Server as per particular embodiments of the present disclosure.
Figure 6:
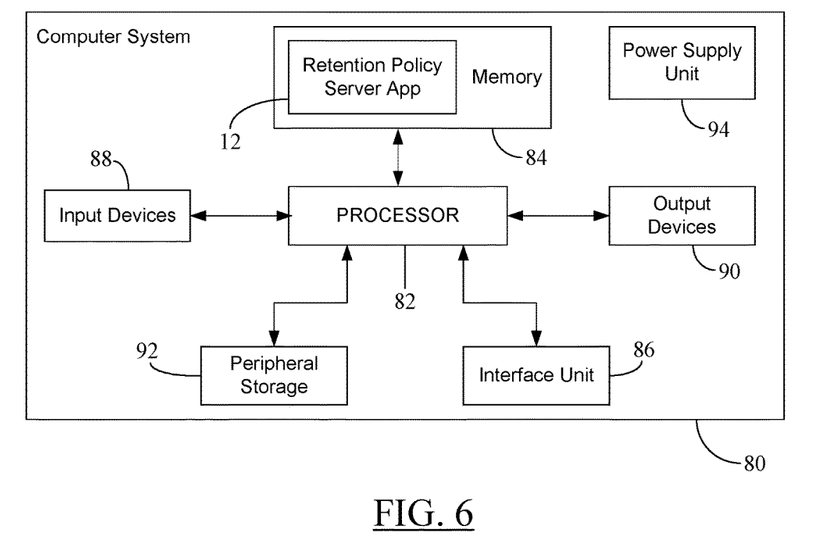
FIG. 6 illustrates an example configuration of a computer system that can be used to implement the rule-based artifact retention policy server described herein.

FIG. 1 shows an exemplary arrangement 10 to implement a rule-based artifact retention policy using an Artifact Retention Policy Server 12 (more simply, "policy server" or "retention server") as per particular embodiments of the present disclosure. In some embodiments, the policy server 12 may be an information handling system (discussed earlier). In other embodiments, the policy server 12 may be a software application. As shown, the policy server 12 may internally host a rules engine 14 comprising program code to retain and process the artifact/package retention rules 16. In particular embodiments, the rules engine 14 may be configured by a user. The program code constituting the rules engine 14 may be stored in a storage unit or memory in a host computer system (not shown) and executed by a processor in the host computer. Such memory, processor, and other exemplary architectural details of the host computer are shown in FIG. 6 and discussed later below. The retention rules 16 may be supplied to the rules engine 14 by a user such as, for example, an IT administrator. In certain embodiments, the user may consult with the company's legal department to devise appropriate retention rules that comply with retention-related legal and audit requirements for the relevant software. The retention server 12 may interact with a database 18, which may be a distributed database in particular embodiments. Based on the retention rules 16, the server 12 may store the artifacts in the database 18 for the retention period specified by the respective rules 16 and, upon expiration of the retention period for an artifact, the server 12 may instruct the database 18 to delete the artifact/package as part of the server's retention policy-based clean-up operation.

Although the database 18 is shown as a separate unit in FIG. 1, it is understood that, in particular embodiments, the database 18 may be a part of the data storage or memory unit of the host computer, as discussed later with reference to the embodiment in FIG. 6. The internal physical storage or architectural configuration of the database 18 is not relevant to the present disclosure and, hence, no additional details thereof are provided here. Furthermore, it is observed that the rules 16 may be either provided using the same computer system as that implementing the policy server 12 or received at policy server 12 from another source (not shown) like a client computer system, a web server, and the like.

Figure 2:
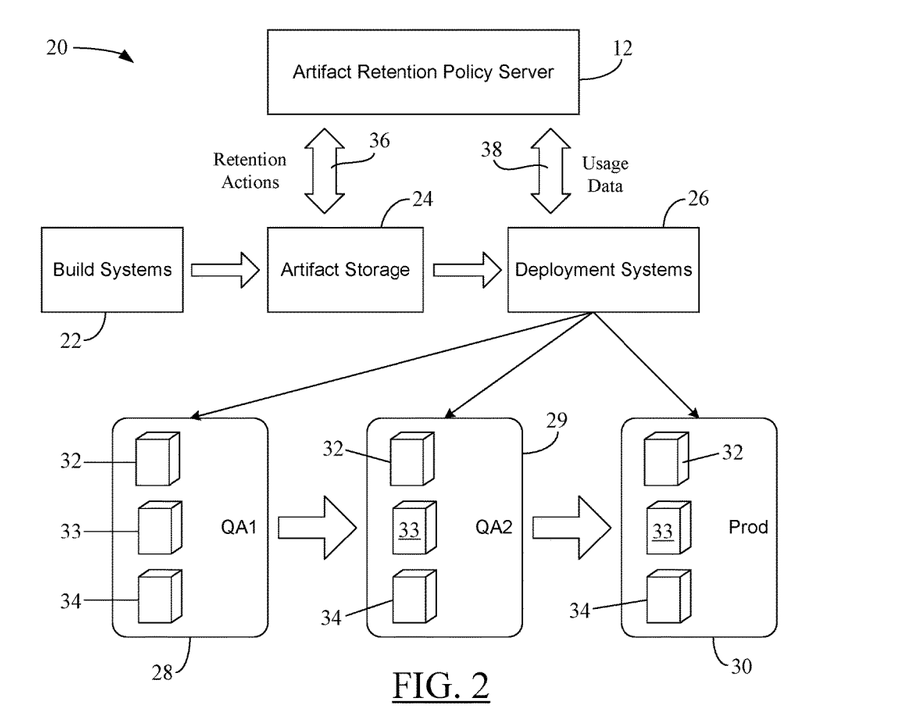
FIG. 2 depicts an exemplary topology showing connections of an artifact retention policy server in a software development environment to provide artifact retention based on the usage status of an artifact as per particular embodiments of the present disclosure.

FIG. 2 depicts an exemplary topology 20 showing connections of an artifact retention policy server—such as the policy server 12 in FIG. 1—in a software development environment to provide artifact retention based on the usage status of an artifact as per particular embodiments of the present disclosure. The software development environment may include three primary components: one or more build systems 22, one or more artifact storage servers 24, and one or more deployment systems 26. One or more of the components 22, 24, 26 may be implemented in hardware, software, or a combination of hardware and software. The build systems 22 may convert the source code of the software package or application into executable binaries or artifacts, which may be stored in the artifact storage 24. In particular embodiments, the artifact storage 24 may be separate from the database 18, which may be used by the policy server 12 to retain the artifacts for the time durations specified by the applicable rules 16.

The artifacts received at the storage 24 may be processed by the deployment systems 26 before they are released to the end user/customer. In the embodiment of FIG. 2, three exemplary stages of deployment 28-30 are shown to illustrate difference levels of Quality Assurance (QA)—such as levels QA1 and QA2—an artifact may go through prior to being released to the customer as part of the final product ("Prod") stage 30. In certain embodiments, each stage 28-30 may be a different deployment system. In other embodiments, a single deployment system may support various levels of deployment. For example, one deployment system may support the levels 28-29, whereas another deployment system may support level 30. In any event, each deployment system 26 may notify the policy server 12 of the respective deployment status of each artifact received thereby or may be queried by the policy server 12 about the deployment status of an artifact. In FIG. 2, three exemplary artifacts 32-34 are also shown by way of illustration only. It is noted here that in an actual software development platform, there may be more or less than three stages of QA and there may be many more artifacts being processed per stage. It is also noted here that although FIG. 2 shows that all of the artifacts 32-34 survive each QA level 28-30, such may not be the case always. For example, during QA review, one or more artifacts may be found to have bugs or defects and, hence, may not be allowed to proceed to the next QA level and may not go for final deployment in the "Prod" stage 30. Therefore, selective retention based on an artifact's usage status may be more preferable than storing all artifacts having the same age or type for the same duration. In the context of FIG. 2, for example, a rule may specify that the artifacts at QA1 stage 28 may be retained for 30 days, another rule may specify that the artifacts reaching the QA2 stage 29 may be retained for 90 days, and a further rule may mandate a retention of 2 to 10 years (as needed for legal compliance) for artifacts reaching the "Prod" stage 30. Such selective retention may significantly reduce unnecessary storage of artifacts and, hence, may provide substantial cost savings in implementation of retention policies for various software packages.

In particular embodiments, the retention server 12 may connect directly with artifact storage servers 24 and deployment systems 26 while maintaining its own internal state about the retention processes and rules that need to be followed. In FIG. 2, the bi-directional arrow 36 indicates the server's 12 connection to the artifact storage 24 and the bi-directional arrow 38 indicates the server's 12 connection to the deployment system(s) 26. Periodically, the policy server 12 may build a database—such as the database 18 in FIG. 1—of artifacts based off of information retrieved from the deployment systems 26 and may act on those artifacts based on the rules in the rules engine 14 hosted internally by the server 12 and configured by a user. Thus, as noted at arrow 36 in FIG. 2, the retention actions may be performed by the server 12 on the artifacts retrieved from the artifacts storage 24. However, these actions may be based on the artifact-specific usage data obtained from the deployment system(s) 26, as noted at arrow 38. In certain embodiments, the policy server 12 may perform retention/purge actions at pre-defined time intervals such as, for example, once every 24 hours, everyday at noon and midnight, once every week, and the like.

By tracking deployments of various artifacts, the policy server 12 may tag artifacts based on what environments they have been deployed to. As discussed later with reference to FIG. 5, in certain embodiments, a user may provide to the server 12 different "tags" or "classes" of retention along with retention rules per tag. The policy server 12 then may implement policy decisions from the configurable rules engine 14 which can be evaluated for each tagged package. For example, if the deployment systems 26 show that an artifact has been promoted to the QA2 status, the policy server 12 may label that artifact internally as "QA2" and then any rules in its rules engine 14 that apply to artifacts having "QA2" label/tag may be applied to the current artifact on the next retention cycle. In particular embodiments, based on its connections to the artifact storage 24 and the deployment systems 26, the policy server 12 may have the ability to identify an artifact by name, tag, deployment location, deployment status, and the like. Thus, when the policy server 12 is informed by the deployment systems 26 that an artifact's deployment status is changed to a new status—such as, for example, from QA1 status to QA2 status, the policy server 12 can easily re-assign a new deployment status-specific tag (here, the "QA2" tag) to the artifact in question, identify a new tag-specific rule associated with the new tag (the "QA2" tag), and retain the artifact in the database 18 for a new retention period indicated by the new tag-specific rule (for example, a 90-day retention rule for artifacts with "QA2" tags).

Figure 3:
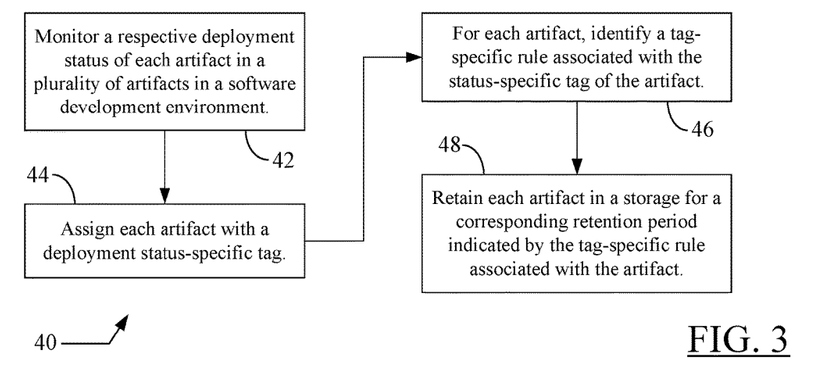
FIG. 3 is an exemplary flowchart depicting various steps that may be performed by a computing system as per particular embodiments of the present disclosure to implement a rule-based artifact retention policy that is based on the usage status of an artifact.

FIG. 3 is an exemplary flowchart 40 depicting various steps that may be performed by a computing system as per particular embodiments of the present disclosure to implement a rule-based artifact retention policy that is based on the usage status of an artifact. In one embodiment, the computing system may be system 80 shown in FIG. 6. In another embodiment, the computing system may be the artifact retention policy server 12 itself. More generally, the computing system performing the steps shown in FIG. 3 may include in hardware and/or software the functionality of the policy server 12 and, hence, the computing system may be considered a rules-enabled system capable of implementing a rule-based artifact retention policy as per teachings of the present disclosure. In one embodiment, the program code for the policy server 12 (and other relevant program code) may be executed by a processor (not shown) in the computing system and, upon execution of the program code, the computing system may be operative to perform the tasks illustrated in FIG. 3.

Initially, at block 42, the computing system may monitor a respective deployment status of each artifact in a plurality of artifacts—such as the artifacts 32-34 in FIG. 2—in a software development environment. The computing system may receive artifact-specific deployment status information from the deployment systems 26 and, based on the received information, the computing system may assign each artifact with a deployment-status specific flag (block 44). For example, as discussed before, an artifact having the QA1 deployment level may be assigned a "QA1" tag, whereas another artifact having the QA2 deployment level may be assigned a "QA2" tag. Thereafter, for each artifact, the computing system may identify a tag-specific rule associated with the status-specific tag of the artifact, as noted at block 46. For example, as mentioned before, one rule in the rules engine 14 may specify that artifacts having the "QA1" tag should be retained for 30 days, whereas another rule in the rules engine 14 may specify that artifacts with the "QA2" tag should be retained for 90 days. Therefore, at block 48, the computing system may retain each artifact in a storage—such as the database 18—for a corresponding retention period (30 days, 90 days, 2 years, and so on) indicated by the tag-specific rule associated with the artifact.

In particular embodiments, the computing system may monitor the retention period of each artifact in the database 18. When the computing system determines that the retention period of an artifact is expired, it may instruct the database 18 to delete that artifact retained therein. In this manner, unneeded packages may be purged in order to save storage space and lower the operational costs for retention compliance.

Figure 4:
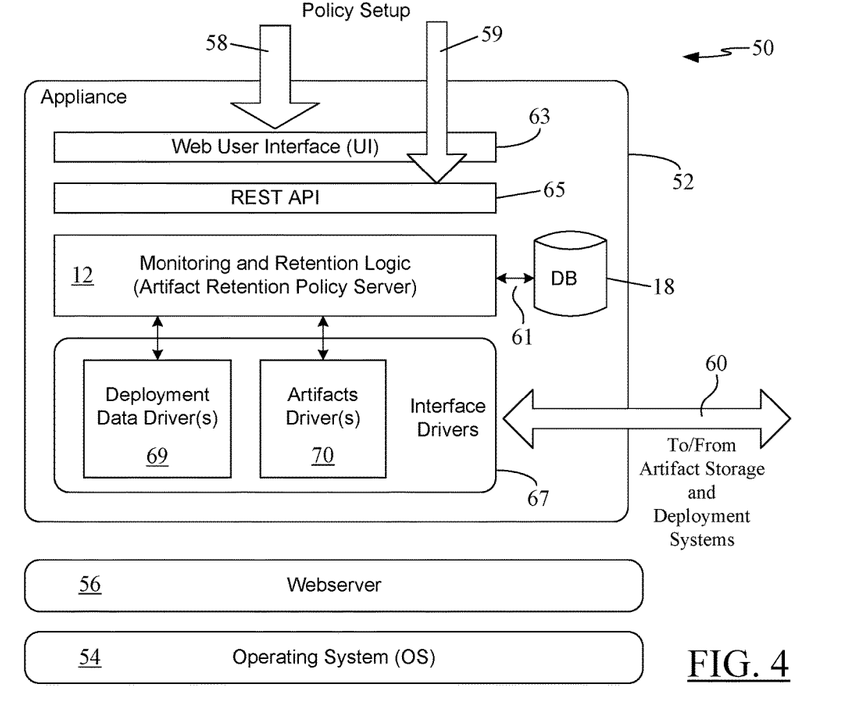
FIG. 4 is an exemplary software architecture illustrating how an artifact retention policy server may be implemented as per particular embodiments of the present disclosure.

FIG. 4 is an exemplary software architecture 50 illustrating how an artifact retention policy server, such as the server 12 in FIGS. 1-2, may be implemented as per particular embodiments of the present disclosure. In the embodiment of FIG. 4, the policy server 12 and the database 18 are shown as being implemented in a Virtual Machine (VM) or Appliance 52. The policy server 12 may be implemented as a web application providing monitoring and retention logic for storage of artifacts in the database 18. In certain embodiments, the appliance 52 may be a virtual machine that is dedicated to hosting a particular web application such as, for example, the application providing the functionality of policy server 12. In particular embodiments, the policy server 12 may be implemented as a virtualized application or cloud-based service using a virtual machine, such as the appliance 52. Generally, the exemplary implementations of the policy server 12 in FIGS. 1-2 and 4 may be compatible with third party systems as well and, hence, the functionality of the policy server 12 may be made available to multiple third party CI/CD product vendors in addition to a company's in-house software development team.

As is known, a Virtual Machine (VM), such as the Appliance 52, is a software implementation of a machine (i.e., a computer) that executes programs like a physical machine. Thus, a VM is a software-based, fictive computer that may be based on specifications of a hypothetical computer or emulate the computer architecture and functions of a real world computer. Each VM instance can run any operating system supported by the underlying hardware. Thus, users can run two or more different "guest" operating systems simultaneously, in separate "virtual" computers or VMs. An operating system 52 and a web-server software 56 associated with the appliance 52 are also shown in FIG. 4. Virtual machines may be created using hardware virtualization that allows a VM to act like a real computer with an operating system. Software executed on these VMs is separated from the underlying hardware resources. Thus, for example, a computer that is running Microsoft Windows® operating system may host a virtual machine that looks like a computer with a Linux® operating system. In that case, Linux-based software can be run on the virtual machine. In hardware virtualization, the "host" machine is the actual machine/computer on which the virtualization takes place, and the "guest" machine is the VM. For example, in some embodiments, the appliance 52 may be hosted using the hardware resources of the computer system 80 in FIG. 6. The words "host" and "guest" are generally used to distinguish the software that runs on the physical machine from the software that runs on the VM. In a cloud computing environment where virtualized applications may be routinely deployed, running multiple instances of virtual machines on shared computing resources/hardware may lead to more efficient use of computing resources, both in terms of energy consumption and cost effectiveness. The shared hardware may be from a single computer or may include hardware resources from a distributed computing environment.

In the embodiment of FIG. 4, the policy server 12 may be based on a stack of free and open-source software in a dedicated virtual appliance 52, which may execute the server application using the application-specific operating system 54 and web-server 56. As discussed later with reference to FIG. 5, the workflow of the policy server application 12 may include three stages—the policy set-up stage 74, the data collection stage 75, and the retention stage 76. In FIG. 4, the arrows 58-59 relate to the policy setup stage 74, the arrow 60 relates to the data collection stage 75, and the arrow 61 relates to the retention stage 76. In the embodiment of FIG. 4, a user may interact with the policy server application 12 through a web User Interface (UI) 63 and Representational State Transfer (REST) Application Programming Interface (API) 65 hosted by the appliance 52. In certain embodiments, instead of the web API design model of REST, a Simple Object Access Protocol (SOAP) based API may be used to allow a user to access the functionality of the policy server 12. As part of the policy set-up stage at arrows 58-59, the user may provide different tags and tag-specific retention rules to the rules engine (not shown in FIG. 4) of the policy server 12 via the web UI 63 provided to the user through the REST API 65. For communication outward to the artifact storage 24 and deployment systems 26, the policy server application 12 may employ a "strategy" design pattern set of interface drivers 67. As shown, the interface drivers 67 may include one or more deployment data drivers 69 and one or more artifacts drivers 70. The drivers 69-70 may allow the policy server 12 to interact with a variety of artifact systems and deployment systems during the data collection stage 75 (discussed later with reference to FIG. 5). The server 12 may just need to associate the appropriate driver or "strategy" with the target system—an artifact system or a deployment system—to be able to handle the data collection and artifact retention tasks appropriately. In particular embodiments, the deployment data drivers 69 may include drivers for a number of different deployment systems such as, for example, the Octopus Deploy system, the open-source Jenkins automation system and so on. Similarly, the artifact drivers 70 may include drivers for a number of different artifact storage systems such as, for example, the earlier-mentioned Artifactory and NuGet software, a file share server (for example, a Windows® based network drive), a Microsoft® SharePoint server, and so on.

Figure 5:
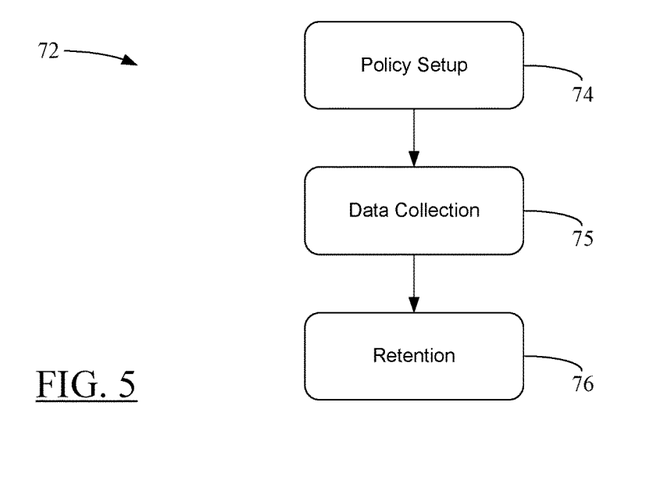
FIG. 5 shows an exemplary three-stage workflow of a policy server application as per certain embodiments of the present disclosure.

FIG. 5 shows an exemplary three-stage workflow 72 of a policy server application as per certain embodiments of the present disclosure. The policy server application may be a software implementation of the policy server 12 shown in FIGS. 1-2 such as, for example, the VM-based implementation shown in the embodiment of FIG. 4. The three stages associated with the policy server workflow include a policy setup stage 74, a data collection stage 75, and a retention stage 76. It is noted at the outset that the workflow 72 in FIG. 5 does not imply that the policy server application 12 has to perform each stage 74-76 for each artifact retention operation. For example, once the policy setup 74 is complete, the policy server 12 may simply carry out data collection 75 and artifact retention 76 based on the rules established during the policy setup stage 74; the policy server 12 need not repeat the policy setup stage 74 for each pair of data collection and retention operation 75-76.

During the policy setup stage 74, a user—such as an IT administrator—may provide different tags/labels or "classes" of retention to the policy server 12. As noted before with reference to the embodiment in FIG. 4, the user may input various contents via a web-based user interface. Some exemplary tags or "classes" of retention include a "Dev" or "QA1" tag for artifacts/packages in the development build level such as the QA1 level 28 in FIG. 2, a "Prod" tag for artifacts in the final product stage 30 and ready to be released to the customer, a "PCI" (Payment Card Industry) or "QA2" label for artifacts that have progressed beyond the initial build level 28, and so on. In some embodiments, the "PCI" label may refer to a special class of data or the code (or deployment of the code) that will be handling that data. It is understood that the tags or labels mentioned here are merely examples. Many different types of tags or labels may be devised as per the various levels of deployments in a CI/CD process or any other process of building and deploying software packages. During the policy setup stage 74, the user may also provide retention rules per tag. For example, the user may specify that an artifact with the "Dev" or "QA1" tag may be retained for 30 days of its creation or last use, an artifact with the "QA2" tag may be retained for 90 days of its creation/last use, an artifact with a "Prod" tag may be retained for 730 days (or 2 years) of its creation/last use, another artifact with a "Prod" tag for a different software release may be retained for 3520 days of its creation/last use, and so on. The retention rules may be stored in the rules engine 14 for implementation of the user-specified retention policy. In some embodiments, at policy setup stage 74, the user also may provide mappings of tags to corresponding software development environments using a regular expression (regex). The regex may instruct the policy server application 12 to look for a specified pattern of text and then assign the user-specified tag to the artifact having the matching pattern. For example, the user may desire that in a "Company", all artifacts having the text "production.Company.com" associated therewith may be assigned the tag "Prod". In that case, the regex instruction may be: "*.production.Company.com==Prod". In particular embodiments, at the policy setup stage 74, the user also may provide to the rules engine 14 the run times for retention policy rules as well as intervals for data polling. For example, the user may specify that the policy server 12 may need to run retention policy to perform retention/purge actions (which may include data collection 75 and retention 76 operations in certain embodiments) once every 24 hours, or everyday at noon and midnight, or once every week, and the like.

It is noted here that the user, like and IT administrator, may first configure the desired rules for artifact retention policy prior to providing the rules to the policy server 12 during the policy setup stage 74. In particular embodiments, the rules may be based on any appropriate data that is available from the deployment systems 26 (FIG. 2). Most commonly, the retention rules for a package may be based on, for example, one or more of the following events: (i) the time since the package was built, (ii) the time since the package was last deployed or downloaded (for example, to a customer computer), (iii) the time since the package was deployed to a specific environment (for example, testing, debugging, production, etc.), and (iv) the time since the package was deployed to a specific host or hostname (for example, "marketing department", "insurance analysis group", "subscriber server", etc.). In particular embodiments, these retention rules may be modifiable with regex to enable the user to input rules similar to: "30 days since deployed to environment X==SIT*", where "SIT" refers to "System Integration Test", which is a label for a type of Quality Assurance (QA) environment.

In particular embodiments, once the rules are established during the policy setup stage 74, the rules engine 14 may evaluate and execute the rules as Cron jobs at intervals specified by the user. As is known, the software utility Cron is a time-based job scheduler in Unix-like computer operating systems that allows tasks (jobs) to be automatically and periodically run in the background at set intervals by the Cron process. Thus, in the context of FIG. 4, the operating system 54 may be a Unix-like operating system on which the policy server 12 may run the Cron jobs. The user may define the fixed times, dates, or intervals to schedule the execution of retention policy tasks by the policy server 12. For example, the scheduling entry "@monthly" in a Cron command may require rules engine 14 to evaluate the user-provided retention rules once a month at midnight of the first day of the month, or the entry "@daily" may require execution of the rules once a day at midnight, and so on.

Referring again to FIG. 5, once the retention policy rules are established and input to the rules engine 14, the policy server application 12 may commence data collection 75 and artifact retention 76 operations. During the data collection stage 75, the policy server 12 may poll the deployment systems 26 as per the schedule specified by the user-provided rules to collect and tag relevant retention data for internal storage in the database 18. As noted before, based on its connections to the artifact storage 24 and the deployment systems 26, the policy server 12 may have the ability to identify an artifact by name, tag, deployment location (or target environment), deployment status, and the like. Therefore, the policy server 12 may poll the deployment systems 26 using, for example, one or more of the following: names of deployed packages, the target environments in which the packages are deployed, and the target hostnames for deployed packages. Thereafter, the policy server application 12 may tag the packages with matching tags or classes of retention provided by the user during the policy setup stage 74.

In the retention stage 76, the policy server application 12 may store the tagged packages in an internal storage system such as, for example, the database 18 shown in FIGS. 1 and 4. The storage operation may be performed at pre-defined periods or intervals such as, for example, when the retention rules are evaluated as specified by the user during policy setup 74. Optionally, the policy server application 12 also may tag or mark packages in the target deployment system. In particular embodiments, the policy server application 12 may query the package storage system or database 18 for package information such as, for example, when a new tag (for example, the "QA2" tag) has been assigned to a previously-tagged (for example, the "QA1" tag) package, so as to be able to apply appropriate retention rule to the package. The policy server application 12 also may monitor the expiry of retention period of each artifact in the database 18, and may instruct the storage system 18 to delete the packages whose corresponding retention periods are expired.

As mentioned before, a single application working in a true CI/CD fashion with pull request builds can produce as much as 100 GB of artifacts a day. In case of a software vendor supporting over 70 applications, this would translate to a potential of 7 TB of artifacts produced per day. The storage cost of 7 TB of artifacts may be in the range of $50,000 per day, or approximately $36 million for 2 years of regulatory compliance for all artifacts. With the rule-based retention policy server as per teachings of the present disclosure, the storage footprint may be reduced up to approximately 95%, resulting in the savings of up to approximately $33 million for the 2-year storage scenario considered here. In case of the companies implementing the current industry standard best practices (of manually implementing Cron jobs combined with project-specific ad-hoc retention policies), the usage-based retention rules implemented by the policy server as discussed in the present disclosure may still provide the savings of approximately $1 million to $2 million per year. These estimates do not include the time saved now that the developers do not have to create their "home-grown" set of retention scripts.

FIG. 6 illustrates an example configuration of a computer system (or computing device) 80 that can be used to implement the rule-based artifact retention policy server, such as the server 12 in FIGS. 1-2 and 4, described herein. In particular embodiments, the computer system 80 may or may not include the database 18 as part of the memory or peripheral storage thereof. The computer system 80 may be suitably configured to implement the functionality of the policy server 12 according to the teachings of the present disclosure. The computer system 80 may include one or more processors 82, a memory unit 84, an interface unit 86 providing communication interfaces, one or more input devices 88, one or more output devices 90, and a peripheral storage unit 92, connected to the processor 82 as shown and configured to communicate with each other, such as via one or more system buses (not shown) or other suitable connection.

In one embodiment, the input devices 88 may provide data inputs—such as user inputs during the policy setup stage 74 (FIG. 5)—to the processor 82 and the policy server application 12 for further processing. The input devices 88 may include, for example, a touchpad, a camera, a computer keyboard, a touch-screen, a joystick, a physical or virtual "clickable button," a computer mouse/pointing device, and the like. A display screen is an example of the output device 90. Other examples of an output device include a graphics/display device, a computer screen or monitor, an alarm system, or any other type of data output device. In some embodiments, the input device(s) 88 and the output device(s) 90 may be coupled to the processor 82 via an I/O or peripheral interface(s). In some embodiments, the computer system 80 may include more than one instance of the devices shown. In various embodiments, all of the components shown in FIG. 6 may be housed within a single housing. In other embodiments, the computer system 80 may not include all of the components shown in FIG. 6. Furthermore, the computing device 80 may be configured as a standalone system, as a server system, as a client system, or in any other suitable form factor.

The processor 82 is a hardware device that may include a single processing unit or a number of processing units, all of which may include single or multiple computing units or multiple cores. When the computing device 80 is a multi-processor system, there may be more than one instance of the processor 82 or there may be multiple processors coupled to the processor 82 via their respective interfaces (not shown). The processor 82 may include an integrated Graphics Processing Unit (GPU) or the GPU may be a separate processor device in the system 80. The processor 82 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 82 may be configured to fetch and execute computer-readable instructions stored in the memory 84, the peripheral storage 92, or other computer-readable media. In some embodiments, the processor 82 may be a System on Chip (SoC).

The memory 84 and the peripheral storage unit 92 are examples of non-transitory computer media (e.g., memory storage devices) for storing instructions that can be executed by the processor 82 to perform the various functions described herein. For example, the memory unit 84 may include both volatile memory and non-volatile memory (e.g., RAM, ROM, or the like) devices. Further, in particular embodiments, the peripheral storage unit 92 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 84 and mass storage devices constituting the peripheral storage 92 may be collectively referred to as memory or computer storage media herein, and may be a media capable of storing computer-readable, processor-executable program instructions as computer program code that can be executed by the processor 82 as a particular machine configured for carrying out the operations and functions described in the implementations herein.

In some embodiments, a database, like the database 18 in FIGS. 1 and 4, may be a part of the memory of the computing device 80. In other embodiments, the database may be external to the computing device 80. When the computer system 80 includes a database, the database may form a part of the memory unit 84 or the peripheral storage 92. In certain embodiments, the database 18 may be part of the internal storage of the policy server application 12.

The computing device 80 may also include one or more communication interfaces as part of its interface unit 86 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet and the like. Communication interfaces in the interface unit 86 can also provide communication with external storage (not shown), such as in a storage array, network attached storage, storage area network, one or more databases, or the like.

The computer storage media, such as the memory 84 and the mass storage devices in the peripheral storage 92, may be used to store software and data. For example, the computer storage media may be used to store the operating system (OS) for the computing device 80, various device drivers for the device 80, the contents of the database 18, various rules and other inputs provided by the user during the policy setup stage 74 (FIG. 5), and the data such as audio content, video content, text data, streaming content, or any other type of content. The computer storage media also may store software applications such as a word processing application, a spreadsheet application, software to implement VM functionality (for example, to implement the appliance 52 in the embodiment of FIG. 4), and the like. The program code for the software applications and the OS may be executed by the processor 82.

In one embodiment, a non-transitory, computer-readable data storage medium, such as, for example, the system memory 84 or the peripheral data storage unit 92 may store program code or software for the policy server application 12 as per particular embodiments of the present disclosure. In the embodiment of FIG. 6, the system memory 84 is shown to include such program code. It is noted here that, simply for ease of discussion, the same reference numeral "12" is used to refer to various implementations of a retention policy server as per teachings of the present disclosure. However, such common usage does not imply that the policy servers shown in the embodiments of FIGS. 1-2, 4, and 6 are all identical in functionality or implementation. Furthermore, although the policy server 12 is shown as a software application in the exemplary embodiment of FIG. 6, it may be implemented in hardware or a combination of hardware and software. In case of a hardware implementation, for example, the processor 82 may be configured with logic circuits and microcode to implement the functionality of the policy server in conjunction with the storage provided by the memory unit 84 to implement the functionality of the database 18. Other variations in implementations of the policy server 12 may be suitably devised as needed.

In the embodiment of FIG. 6, the policy server application 12 may operate in conjunction with the host OS (not shown) as well as a database manager (not shown) for the database 18. The processor 82 may be configured to execute the program code for the policy server application 12, whereby the computing device 80 may be operative to perform various rule-based artifact retention tasks associated with the policy server 12 as per the teachings of the present disclosure. In one embodiment, such tasks may include, for example, the process steps illustrated in FIGS. 3 and 5. Such tasks also may include, for example, relevant policy server-based operations discussed earlier with reference to FIGS. 1-2 and 4. The program code or software for the policy server application 12 may be proprietary software or open source software which, upon execution by the processor 82, may enable the computer system 80 to perform operations to support rule-based retention and purge of artifacts or software packages as per teachings of the present disclosure.

In particular embodiments, the computing device 80 may include an on-board power supply unit 94 to provide electrical power to various system components illustrated in FIG. 6. The power supply unit 94 may receive batteries or may be connectable to an AC electrical power outlet. In one embodiment, the power supply unit 94 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
monitoring, by a computing system, a respective deployment status of each artifact of a plurality of artifacts in a software development environment, wherein each artifact comprises a particular version of an executable binary derived from a corresponding source code file in a software development process, and wherein the plurality of artifacts comprise different versions of a same software application;
assigning, by the computing system, each artifact with a status-specific tag that identifies a particular deployment environment associated with each artifact;
selecting a particular artifact of the plurality of artifacts;
determining a particular tag assigned to the particular artifact;
identifying, by the computing system, a tag-specific rule associated with the particular tag of the particular artifact, wherein the tag-specific rule specifies a corresponding retention period for individual artifacts of the plurality of artifacts that are assigned the particular tag;
retaining, by the computing system, each artifact in a storage for the corresponding retention period specified by the tag-specific rule associated with the particular tag that is assigned to the particular artifact;
determining, by the computing system, that a deployment status of at least one artifact in the plurality of artifacts is changed to a new deployment status;
re-assigning, by the computing system, the at least one artifact with a new status-specific tag;
identifying, by the computing system, a new tag-specific rule associated with the new status-specific tag; and
retaining, by the computing system, the at least one artifact in the storage for a new retention period indicated by the new tag-specific rule.

2. The method of claim 1, further comprising:
determining, by the computing system, that the corresponding retention period for at least one of the plurality of artifacts is expired; and
instructing, by the computing system, the storage to delete the at least one of the plurality of artifacts retained therein.

3. The method of claim 1, wherein the storage comprises a distributed database.

4. The method of claim 1, wherein:
the software development environment comprises a deployment system to receive one or more of the plurality of artifacts and to provide to the computing system the respective deployment status of each of the one or more artifacts received.

5. The method of claim 1, wherein the method further comprises:
receiving, by the computing system, a corresponding tag for each deployment status and the tag-specific rule for each tag prior to assigning each artifact with the status-specific tag.

6. The method of claim 5, wherein the receiving comprises:

receiving the corresponding tag for each deployment status and the tag-specific rule for each tag from a user of the computing system.

7. A computing system comprising:
a memory storing program instructions; and
a processing unit coupled to the memory and operable to execute the program instructions, causing the computing system to:
monitor a respective deployment status of each artifact of a plurality of artifacts in a software development environment, wherein each artifact comprises a particular version of an executable binary derived from a corresponding source code file in a software development process, and wherein the plurality of artifacts comprise different versions of a same software application;
assign each artifact with a status-specific tag that identifies a particular deployment environment associated with each artifact;
select a particular artifact of the plurality of artifacts;
determine a particular tag assigned to the particular artifact;
identify a tag-specific rule associated with the particular tag of the particular artifact, wherein the tag-specific rule specifies a corresponding retention period for individual artifacts of the plurality of artifacts that are assigned the particular tag;
retain each artifact in the memory for the corresponding retention period specified by the tag-specific rule associated with the particular tag that is assigned to the particular artifact;
determine that a deployment status of at least one artifact in the plurality of artifacts is changed to a new deployment status;
re-assign the at least one artifact with a new deployment status-specific tag;
identify a new tag-specific rule associated with the new deployment status-specific tag; and
retain the at least one artifact in the memory for a new retention period indicated by the new tag-specific rule.

8. The computing system of claim 7, wherein the memory comprises a database.

9. The computing system of claim 7, wherein the program instructions, upon execution by the processing unit, cause the computing system to:
determine that the corresponding retention period for at least one of the plurality of artifacts is expired; and
delete the at least one of the plurality of artifacts retained in the memory.

10. The computing system of claim 7, wherein:
the software development environment comprises a plurality of deployment systems,
each deployment system of the plurality of development systems receives one or more artifacts of the plurality of artifacts.

11. The computing system of claim 10, wherein the program instructions, upon execution by the processing unit, cause the computing system to:
receive a corresponding tag for each deployment status and the tag-specific rule for each tag in the memory prior to assigning each artifact with the status-specific tag.

12. The computing system of claim 11, wherein the program instructions, upon execution by the processing unit, cause the computing system to:
receive the corresponding tag for each deployment status and the tag-specific rule for each tag from a user of the computing system.

13. The computing system of claim 7, wherein the program instructions, upon execution by the processing unit, cause the computing system to:
determine, from each deployment system, a deployment status associated with individual artifacts of the one or more artifacts received by the deployment system.

14. A computer program product comprising a non-transitory computer-usable medium having instructions that are executable by one or more processors to perform operations comprising:
monitoring a respective deployment status of each artifact of a plurality of artifacts in a software development environment, wherein each artifact comprises a particular version of an executable binary derived from a corresponding source code file in a software development process, and wherein the plurality of artifacts comprise different versions of a same software application;
assigning each artifact with a status-specific tag that identifies a particular deployment environment associated with each artifact;
selecting a particular artifact of the plurality of artifacts;
determining a particular tag assigned to the particular artifact;
identifying a tag-specific rule associated with the particular tag of the particular artifact, wherein the tag-specific rule specifies a corresponding retention period for individual artifacts of the plurality of artifacts that are assigned the particular tag;
retaining each artifact in a storage for the corresponding retention period specified by the tag-specific rule associated with the particular tag that is assigned to the particular artifact;
determining that a deployment status of at least one artifact in the plurality of artifacts is changed to a new deployment status;
re-assigning the at least one artifact with a new deployment status-specific tag;
identifying a new tag-specific rule associated with the new deployment status-specific tag; and
retaining the at least one artifact in the storage for a new retention period indicated by the new tag-specific rule.

15. The computer program product of claim 14, wherein the operations further comprise:
determining that the corresponding retention period for at least one of the plurality of artifacts is expired; and
instructing the storage to delete the at least one of the plurality of artifacts retained therein.

16. The computer program product of claim 14, wherein:
the software development environment comprises a deployment system, and
the deployment system receives one or more artifacts of the plurality of artifacts.

17. The computer program product of claim 16, wherein the operations further comprise:
determining, from the deployment system, a deployment status associated with individual artifacts of the one or more of artifacts received by the deployment system.

18. The computer program product of claim 14, wherein the operations further comprise:
receiving a corresponding tag for each deployment status and the tag-specific rule for each tag prior to assigning each artifact with the status-specific tag.

19. The computer program product of claim 18, wherein the receiving comprises:
  receiving the corresponding tag for each deployment status and the tag-specific rule for each tag from a user.

20. The computer program product of claim 14, wherein the storage comprises a distributed database.

* * * * *